(12) United States Patent
Inomata et al.

(10) Patent No.: US 6,773,833 B2
(45) Date of Patent: Aug. 10, 2004

(54) MAGNETIC STORAGE MEDIUM HAVING IMPROVED THERMAL STABILITY AND A MAGNETIC STORAGE DEVICE USING SUCH A HIGH-DENSITY MAGNETIC STORAGE MEDIUM

(75) Inventors: Akihiro Inomata, Kawasaki (JP); E. Noel Abarra, Kawasaki (JP); B. Ramamurthy Acharya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/809,527

(22) Filed: Mar. 15, 2001

(65) Prior Publication Data

US 2002/0039668 A1 Apr. 4, 2002

(30) Foreign Application Priority Data

Sep. 29, 2000 (JP) ........................................ 2000-301466

(51) Int. Cl.[7] .............................. G11B 5/66; G11B 5/70; G11B 5/012; H01F 1/00
(52) U.S. Cl. ................................ 428/694 TM; 428/212; 428/213; 428/336; 428/611; 428/667; 428/900; 360/97.01
(58) Field of Search ......................... 428/694 TM, 336, 428/212, 213, 900, 611, 667; 360/131, 97.01

(56) References Cited

U.S. PATENT DOCUMENTS

| 5,307,223 | A | * | 4/1994 | Doerner et al. ........... 360/97.01 |
| 6,280,813 | B1 | * | 8/2001 | Carey et al. ................ 428/65.3 |
| 6,372,330 | B1 | * | 4/2002 | Do et al. ..................... 428/212 |
| 6,383,668 | B1 | * | 5/2002 | Fullerton et al. ..... 428/694 TM |

* cited by examiner

*Primary Examiner*—Holly Rickman
(74) *Attorney, Agent, or Firm*—Greer, Burns & Crain, Ltd.

(57) ABSTRACT

A magnetic storage medium includes first and second magnetic layers provided on a support substrate such that the first and second magnetic layers have respective first and second magnetizations in an anti-parallel relationship in a state no substantial writing magnetic field is applied. The first and second magnetizations are changed to a parallel relationship when a writing magnetic field is applied to the magnetic storage medium, and the first and second magnetizations are changed to the anti-parallel relationship as a result of a magnetic reversal caused in the second magnetic layer with diminishing of the writing magnetic field. The reversal is caused as a result of the action of a reversing magnetic field that dominates before the writing magnetic field is diminished and becomes zero.

9 Claims, 6 Drawing Sheets

MAGNETIC STORAGE MEDIUM HAVING IMPROVED THERMAL STABILITY AND A MAGNETIC STORAGE DEVICE USING SUCH A HIGH-DENSITY MAGNETIC STORAGE MEDIUM

CROSS-REFERENCE TO RELATED APPLICATION

The present application is based on japanese priorty application No. 2000-301466 filed Sep. 29, 2000, the entire contents of which are hereby incorporated by reference.

BACKGROUND OF THE INVENTION

The present invention generally relates to magnetic storage of information and more particularly to a magnetic storage medium for high-density magnetic recording and a magnetic storage device that uses such a magnetic storage medium.

With the progress of information processing technology, the demand for magnetic storage devices having higher recording density is increasing. This demand for increased recording density is particularly acute in a magnetic disk device called hard disk drive that uses a rigid magnetic disk for storing information. Thus, intensive efforts are being made for increasing the recording density of magnetic storage media, and various proposals have been made so far.

Meanwhile, there is a requirement in such high-density magnetic storage media in that a magnetic signal can be reproduced therefrom with low medium noise. Further, the high-density magnetic storage media are required to have a high thermal stability.

As noted before, considerable progress have been made with regard to the improvement of recording density as far as the art of horizontal or lengthwise magnetic recording is concerned. These progresses include development of low-noise magnetic media and high-sensitivity magnetic head such as GMR (giant magneto-resistive) head or spin-valve head.

A typical high-density magnetic recording medium includes a foundation layer formed on a substrate and a magnetic layer is provided on the foundation layer as a recording layer, wherein the magnetic layer is generally formed of a Co alloy layer while the foundation layer may be formed of a Cr layer or a Cr-alloy layer.

Various proposals have been made for reducing the medium noise of high-density magnetic storage media. For example, Okamoto, et al., "Rigid Disk Medium for 5 Gbit/in$^2$ Recording," AB-3, Intermag. '96 Digest, describes an approach that achieves the reduction of the medium noise by way of using a CrMo alloy for the foundation layer. By using a CrMo alloy in the foundation layer, it becomes possible to reduce the thickness of the magnetic layer, while the use of such a thin magnetic layer enables a reduction of particle size and particle size variation in the magnetic layer.

Further, the U.S. Pat. No. 5,693,426 describes the use of a foundation layer formed of NiAl. Further, Hosoe, et al., "Experimental Study of Thermal Decay in High-Density Magnetic Recording Media," IEEE Trans. Magn. vol. 33, 1528, 1997, describes the use of a CrTi alloy for the foundation layer of the magnetic storage media for reducing the medium noise.

The composition of the foundation layer noted above is effective for facilitating in-plane alignment of crystal orientation in the magnetic layer, while such an improvement of crystal orientation in the magnetic layer has an effect of increasing the remnant magnetization and thermal stability of a magnetized recording bit. Furthermore, a decrease of the thickness of the magnetic layer contributes to the improvement of resolution at the time of reading.

Further, investigations are made for reducing the width of the transition region between the recording bits, and further for reducing exchange coupling between the magnetic particles in the magnetic layer by causing segregation of Cr to the grain boundary of the CoCr alloy crystals.

On the other hand, there is a tendency that the thermal stability of the magnetic recording dots formed in the magnetic layer is degraded with decreasing particle size of the magnetic crystals in the magnetic layer, as such a decrease of the particle size facilitates mutual isolation of the magnetic crystals in the magnetic layer. In view of the fact that the demagnetization effect, which is caused in association with the formation of magnetic dots in the magnetic layer, increases with increasing linear density of the magnetic recording dots on the magnetic storage medium, the high-density magnetic storage medium having such ultrafine magnetic particles in the magnetic layer becomes extremely susceptible to thermal agitation.

According to Lu, et al., "Thermal Instability at 10 Gbit/in$^2$ Magnetic Recording," IEEE Trans. Magn. vol. 30, pp. 4230, 1994, it was demonstrated, by way of micro-magnetic simulation, that a magnetic storage medium containing magnetic particles having a diameter of 10 nm in the magnetic layer experiences an extensive thermal decay when a signal is recorded with a linear recording density of 400 kfci (fci: flux-change per inch), provided that the anisotropy constant Ku is set so as to satisfy the relationship Ku•V/kB•T~60 for suppressing the exchange coupling between the magnetic particles. Here, Ku is a constant representing the magnetic anisotropy, V represents an average mass of the magnetic particles, kB represents the Boltzmann's constant, and T represents the temperature. The foregoing quantity Ku•V/kB•T is also called thermal stability coefficient.

Abarra et al., "Thermal Stability of Narrow Track Bits in a 5 Gbit/in$^2$ Medium," IEEE Trans. Magn. vol. 33, pp. 2995, 1997, on the other hand, reports that the existence of inter-particle exchange interaction improves the thermal stability of the magnetic dots, based on MFM (magnetic force microscopic) analysis of a CoCrPtTa/CrMo medium designed for a recording density of 5 Gbit/in$^2$, for the case the magnetic layer is recorded with a linear density of 200 kfci.

When the linear recording density exceeds the foregoing value of 200 kfci, on the other hand, it was indicated that suppressing of the inter-particle magnetic coupling is necessary. One solution to deal with this problem would be to increase the magnetic anisotropy of the magnetic layer. However, this approach raises the problem that the magnetic head is subjected to excessive load at the time of writing of information.

It is known that the coercive force of a thermally unstable magnetic medium increases rapidly with decrease of the switching time. This is reported for a magnetic tape medium by Ho et al., "High Speed Switching in Magnetic Recording Media," J. Magn. Mang. Mater. vol. 155, pp. 6, 1999, and for a magnetic disk medium by Richter, J. H., "Dynamic Coercivity Effect in Thin Film Media," IEEE Trans. Magn. vol. 34, pp. 1540, 1999. Such a dynamic change of the coercive force causes an adversary effect at the time of high-speed writing in that the magnitude of the magnetic field induced by the magnetic head for writing information has to be increased with decreasing switching time.

Meanwhile, there is a proposal to improve the thermal stability of magnetic storage medium by applying a suitable texture processing to the substrate located underneath the magnetic layer. By applying such a texture processing, the alignment of magnetic crystals in the magnetic layer is improved. For example, Akimoto, et al., "Magnetic Relaxation in Thin Film Media as a Function of Orientation," J. Magn. Magn. Mater., 1999, discovered, based on micromagnetic simulation, that the effective value of the term Ku•V/kB increases in response to slight increase of the crystal alignment in the magnetic layer. Based on this discovery, Abarra, et al. could successfully reduce the time-dependence of the coercive force and improve the overwrite performance of the magnetic medium, as is reported in Abarra, et al., "The Effect of Orientation Ratio on the Dynamic Coercivity of Media for >15 Gbit/in$^2$ Recording," EB-02, Intermag. '99, Korea.

Further, there is a proposal of the use of a keeper layer for improving the thermal stability of a magnetic storage medium further.

A keeper layer comprises a soft magnetic layer provided parallel to the magnetic layer above or below the magnetic layer, wherein the soft magnetic layer functions to reduce the demagnetization field of the magnetic bits recorded in the magnetic layer. Typically, a Cr magnetic insulation layer is interposed further between the magnetic layer and the soft magnetic layer.

This approach, however, has a problem in that the magnetic decoupling between the particles in the magnetic layer cannot be achieved due to the existence of continuous exchange coupling between the magnetic layer and the soft magnetic layer and the resultant increase of the medium noise.

In order to eliminate the foregoing problem, the inventor of the present invention has proposed, in a related art application of the present invention, a magnetic storage medium comprising first and second magnetic layers exchange coupled with each other. In the magnetic storage medium of the related art, the second magnetic layer forms an exchange coupled structure together with a non-magnetic coupling layer provided thereon, and the first magnetic layer is provided in exchange coupling with the second magnetic layer via the non-magnetic coupling layer. Thereby, both magnetic layers are magnetized in an anti-parallel relationship.

According to the foregoing proposal, it was demonstrated that the thermal stability of the magnetic bits recorded on the magnetic layer is improved significantly and the medium noise is reduced at the same time. Thus, the magnetic storage medium of the foregoing related art achieves the reliable high-density magnetic recording with minimized medium noise. More specifically, the magnetic storage medium of the foregoing related art has an advantageous feature, associated with the anti-parallel relationship of magnetization between the first and second magnetic layers and partial cancellation of the magnetization caused as a result of such a construction, in that the effective size of the magnetic particles can be increased without causing substantial effect on the resolution of the magnetic storage medium. By increasing the effective size, and hence the effective volume, of the magnetic particles in the magnetic layer, the thermal stability of the magnetic storage medium is improved substantially.

In the magnetic storage medium of the foregoing related art, a parallel relationship appears in the magnetization of the first and second magnetic layers when an external magnetic field is applied to the magnetic storage medium and that the initial anti-parallel relationship is restored when the external magnetic field is removed. For this to occur, it is necessary that one of the first and second magnetic layers undergoes magnetic reversal in response to the reduction of the external magnetic field. It should be noted that the magnetic storage medium of the related art achieves the desired thermal stability by increasing the overall or total thickness of the magnetic layers therein, while causing magnetic reversal in some of the magnetic layers.

When one or more of the magnetic layers supposedly causing the magnetic reversal in the magnetic storage medium have failed to cause the necessary magnetic reversal, a medium noise is induced and the medium noise thus induced causes a difficulty in the designing of the magnetic storage medium or the magnetic head that cooperates with the magnetic medium.

General solution for improving a magnetic storage medium with regard to thermal stability would be:

(1) to increase the volume of the particles by increasing the thickness of the magnetic layer; or (2) increase the magnetic anisotropy constant Ku.

However, any of these conventional approaches applied to the magnetic layer that is supposed to cause the magnetic reversal in the magnetic storage medium would invite an increase in the coercive force, and the magnetic reversal would become difficult.

SUMMARY OF THE INVENTION

Accordingly, it is a general object of the present invention to provide a novel and useful magnetic storage medium wherein the foregoing problems are eliminated.

Another and more specific object of the present invention is to provide a magnetic storage medium capable of reducing medium noise and simultaneously improving thermal stability of magnetic recording made thereon.

Another object of the present invention is to provide a magnetic storage medium comprising:

at least first and second magnetic layers provided on a support substrate, said first and second magnetic layers having respective first and second magnetizations in an anti-parallel relationship in a state no substantial writing magnetic field is applied to said magnetic storage medium, said first and second magnetizations being in a parallel relationship when a writing magnetic field is applied to said magnetic storage medium, said parallel relationship between said first and second magnetizations being changed to said anti-parallel relationship with diminishing of said writing magnetic field as a result of an action of a reversing magnetic field that dominates before said writing magnetic field is diminished and becomes zero.

According to the present invention, the reversing magnetic field acting upon the second magnetic layer that is supposed to have an anti-parallel magnetization with regard to said first magnetic layer dominates with decrease of the writing magnetic field in the opposite direction as the writing magnetic field. As a result, the first and second magnetic layers are in the anti-parallel relationship when the writing magnetic field is eliminated, and the thermal stability of the recorded magnetic bit is improved substantially. Further, the medium noise is reduced and highly reliability is achieved for the magnetic recording by using the magnetic storage medium of the present invention.

Other objects and further features of the present invention will become apparent from the following detailed description when read in conjunction with the attached drawings.

DETAILED DESCRIPTION OF THE INVENTION

PRINCIPLE

Figure 1:
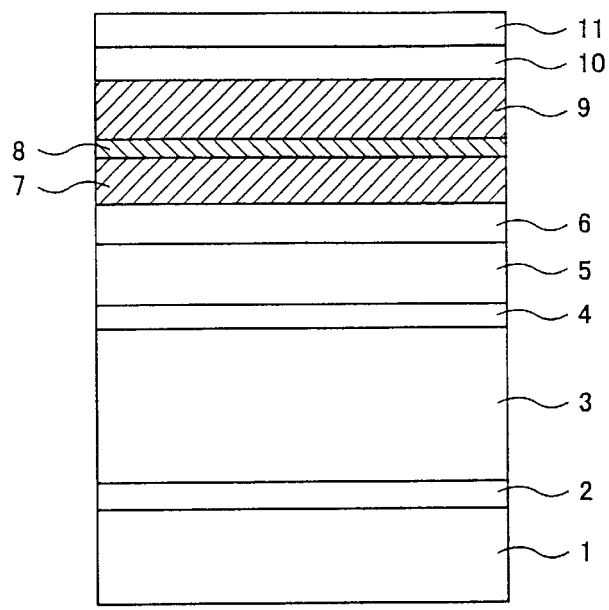
FIG. 1 is a diagram showing the construction of a magnetic storage medium according to a first embodiment of the present invention.

The magnetic storage medium of the present invention uses a plurality of magnetic layers provided on a support substrate in magnetic coupling with each other for improving the thermal stability of magnetic recording made thereon.

More specifically, the magnetic layers are in magnetically anti-parallel relationship when no substantial external magnetic field is applied to the magnetic storage medium as noted before. When writing information, the magnetic layers are made in magnetically parallel relationship as a result of the external magnetic field applied to the magnetic storage medium, while the initial anti-parallel relationship of the magnetism is restored whenever the external magnetic field is removed after the writing process.

In order to maintain the thermal stability of the magnetic recording, it is essential that the magnetic layers recover the original anti-parallel state after the writing process.

Meanwhile, Parkin, S. S. P., "Systematic Variation of the Strength and Oscillation Period of Indirect Magnetic Exchange Coupling through the 3d, 4d and 5d Transition Metals," Phys. Rev. Lett. vol. 67, pp. 3598, 1991, describes a magnetic coupling of a magnetic transition metal, such as Co, Fe, Ni, and the like, with a magnetic layer via a thin non-magnetic exchange layer of Ru or Rh. Further, the U.S. Pat. No. 5,701,223 describes a spin-valve magnetic sensor that uses such a stacked structure for the pinning layer for improving the thermal stability of the magnetic sensor.

Thus, it is preferable to provide a layer of Ru or Rh between a pair of ferromagnetic layers and use a specific thickness for the intervening Ru or Rh layer for controlling the magnetization of the ferromagnetic layers in parallel or anti-parallel relationship. In the case the magnetic storage medium includes two ferromagnetic layers having mutually different thicknesses and the two ferromagnetic layers are in magnetically anti-parallel relationship, it is possible to increase the effective particle size of the magnetic particles in the magnetic layers without causing substantial effect on the resolution of reproducing information.

It is true that the amplitude of the magnetic signal picked up from the magnetic storage medium is decreased as a result of the counteracting demagnetization. Such a decrease of the signal amplitude, however, can be effectively compensated for, by providing an additional magnetic layer with an additional exchange coupling layer underneath the ferromagnetic layers with a suitable thickness and suitable magnetization direction. Thus, the present invention can also increase the signal strength of the magnetic signals reproduced from the magnetic storage medium and increase the effective particle volume.

The foregoing feature of the present invention of improving the thermal stability of magnetic recording by way of causing an exchange coupling within the magnetic storage medium can be realized either by providing the magnetic layers of respective, opposite magnetizations in exchange coupling or by using a stacked ferrimagnetic structure. The present invention provides the condition in which the desired reversal of the magnetic layer takes place with reliability in the magnetic storage medium.

FIRST EMBODIMENT

FIG. 1 shows the construction of a magnetic storage medium according to a first embodiment of the present invention.

Referring to FIG. 1, the magnetic storage medium is formed on a non-magnetic support substrate 1 and includes a first seed layer 2 provided on the substrate 1, an NiP layer 3 provided on the first seed layer 2, a second seed layer 4 provided on the NiP layer 3, a foundation layer 5 provided on the second seed layer 4 and a non-magnetic intermediate layer 6 provided on the foundation layer 5, and a magnetic layers 7 and 9 are provided on the non-magnetic intermediate layer 6 with an intervening non-magnetic exchange coupling layer 8 interposed between the magnetic layers 7 and 9. Further, a protective layer 10 and a lubricating layer 11 are provided consecutively on the magnetic layer 9.

As will be explained later, the magnetic layer 9 disposed away from the substrate 1 as compared with the magnetic layer 7 has a larger coercive force than the magnetic layer 7. Further, it should be noted that it is this magnetic layer 7 that has the reversed magnetization in the state a magnetic recording has been made by an external, recording magnetic field applied to the magnetic storage medium and the recording magnetic field has been removed thereafter.

Figure 2:
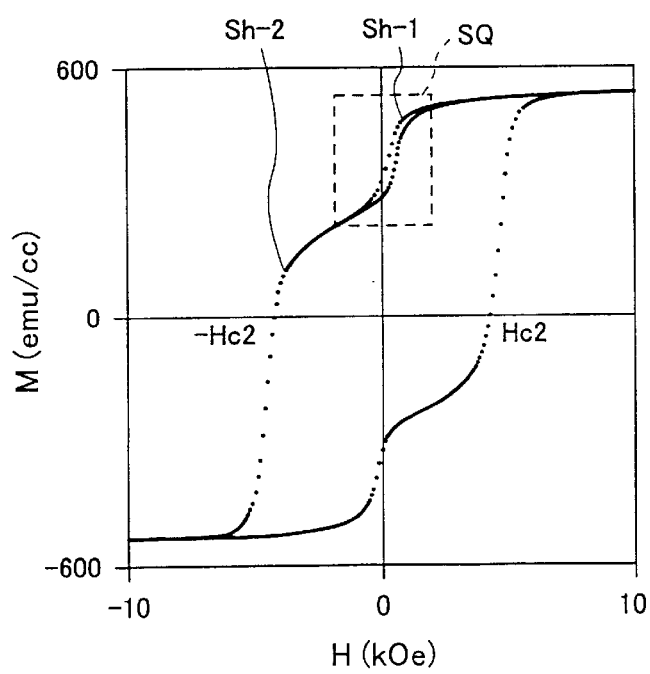
FIG. 2 is a diagram showing a hysteresis loop of the magnetic storage medium of FIG. 1.
Figure 3:
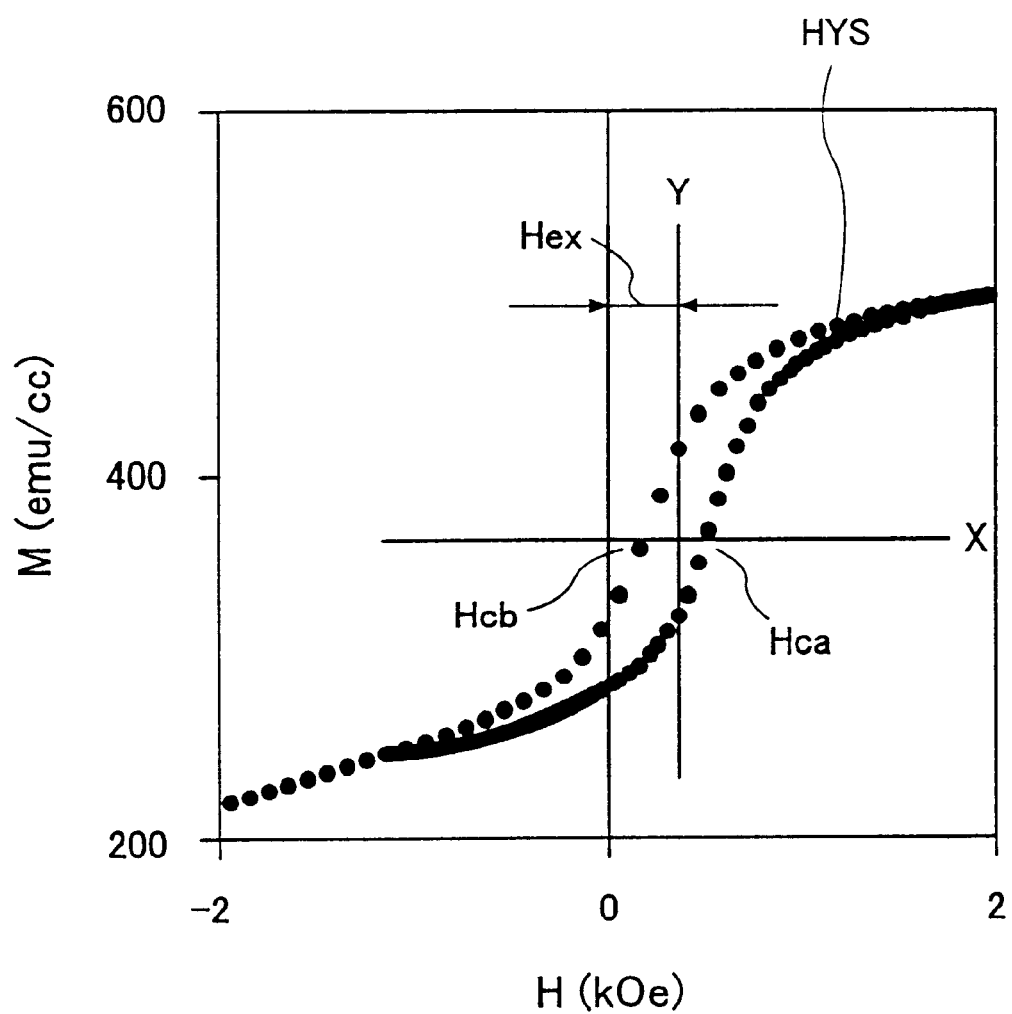
FIG. 3 is a diagram showing a part of FIG. 2 in an enlarged scale.

FIGS. 2 and 3 show the magnetization curve of the composite magnetic structure, formed of the magnetic layers 7 and 9, of the magnetic storage medium of FIG. 1, wherein each of FIGS. 2 and 3 represents a magnetization M (emu/cc) in the vertical axis and an applied magnetic field H (kOe) in the horizontal axis.

More specifically, FIG. 2 shows the hysteresis curve of the foregoing composite magnetic structure for the case of causing a magnetic saturation therein by applying a magnetic field of ±10 kOe, while FIG. 3 shows a minor hysteresis loop observed in a part of the hysteresis curve of FIG. 2 for the case the applied magnetic field is changed in the range represented by SQ in FIG. 2.

Referring to the hysteresis curve of FIG. 2, it can be seen that there occurs a saturation of magnetization when the external magnetic field is increased up to the value of about +10 kOe. With the decrease of the external magnetic field following the foregoing magnetic saturation at +10 kOe, the magnetization M of the composite magnetic structure is decreased along the magnetization curve, wherein it is noted that there appears a steep or stepwise change of magnetization M in the hysteresis curve shortly before the applied magnetic field becomes 0 kOe, as represented by Sh-1 in FIG. 2.

This steep or stepwise change of the hysteresis curve designated by Sh-1 indicates the existence of the reversing magnetic field acting between the magnetic layers 7 and 9.

More specifically, the reversing magnetic field Sh-1 effect becomes appreciable as the magnitude of the applied magnetic field is reduced, and the reversing magnetic field Sh-1 thus emerged causes a magnetic reversal in the magnetic layer 7. As there occurs no magnetic reversal in the magnetic layer 9, there appears the anti-parallel relationship explained before between the magnetic layers 7 and 9. As a result of the anti-parallel relationship of the magnetizations between the magnetic layers 7 and 9, the magnetizations in the respective magnetic layers 7 and 9 cancel out with each other partially, and the differential of the magnetizations between the layers 9 and 7 is observed as the remaining magnetization of the composite magnetic structure in the state where no external magnetic field is applied.

A similar stepwise change of the magnetization is observed also in the negative region of the external magnetic field as designated by Sh-2.

Hereinafter, the phenomenon of the first reversing magnetic field Sh-1 will be examined more closely.

The reversing magnetic field Sh-1 reflects the anti ferromagnetic exchange coupling existing between the magnetic layers 7 and 9 and further provides information about the coercive force of the magnetic layer 7. In the event the magnitude of the coercive force of the magnetic layer 7 is smaller than the exchange coupling field on the magnetic layer 7 as a result of the anti-ferromagnetic coupling of the magnetic layers 7 and 9, the effect of this anti-ferromagnetic coupling increases with decreasing magnitude of the external magnetic field, and the magnetic layer 7 undergoes the magnetic reversal shortly before the magnitude of the external magnetic field reaches zero.

Thus, when the magnetic storage medium of FIG. 1 is used in a magnetic disk drive, the magnetic layers 7 and 9 are magnetized first in parallel relationship with each other by the recording magnetic field induced by a recording magnetic head, and writing of information is made into the magnetic layer 9. As the recording magnetic field is reduced after the recording, the effect of the foregoing reversing magnetic increases and dominates shortly before the recording magnetic field becomes zero as designated by Sh-1. In this state, the magnetic layer 7 alone undergoes the magnetic reversal. In this state, the magnetic layer 7 cancels out the magnetization of the magnetic layer partially.

Thus, the magnetic storage medium of the present embodiment enables increase of the effective particle volume, and the information written into the composite magnetic structure is retained with high stability.

Hereinafter, reference will be made to FIG. 3 showing the minor loop formed in the hysteresis loop of FIG. 2 in the region SQ in enlarged scale.

Referring to FIG. 3, the minor loop itself constitutes a hysteresis loop HYS which is offset in the positive direction of the magnetic field by a distance Hex, wherein the offset distance Hex corresponds to the foregoing exchange coupling field acting on the magnetic layers 7. While there is no particular limitation imposed upon the reversing magnetic field Hex, it is preferable to set the magnitude of the reversing magnetic field Hex to be about 100 Oe or more.

FIG. 3 further shows a horizontal axis X and a vertical axis Y defined with respect to the center of the hysteresis curve HYS. As a result of the exchange coupling between the magnetic layers 7 and 9, it can be seen that the vertical axis Y is offset in the positive direction of the horizontal axis X by the distance Hex. Further, the cross-point of the hysteresis curve HYS with the horizontal axis X provides the coercive force Hc of the magnetic layer 7, wherein it can be seen that there appear two cross-points Hca and Hcb at both lateral sides of the vertical axis Y, in correspondence to two opposite directions of tracing the loop HYS.

In FIG. 3, it is important to note that both cross-points Hca and Hcb are located in the positive region of the horizontal axis H and hence take a positive value. This is the condition that only the magnetic layer 7 undergoes magnetic reversal when the external magnetic field for recording information is reduced to zero and the desired thermal stability of the magnetic recording is achieved. The condition can be represented as $$Hex > Hc,$$

wherein Hex is defined already and Hc represents the coercive force of the magnetic layer 7. In FIG. 3, the coercive force Hc is given by the distance measured from the origin of the Y axis to any of the cross-points Hcb or Hca and takes a positive value.

From the relationship noted above, it is preferable to reduce the thickness of the magnetic layer 7 such that the coercive force Hc thereof is reduced.

The foregoing explanation is applicable also to the case in which the polarity of the external magnetic field H is reversed in the relationship of FIG. 2.

Figure 4:
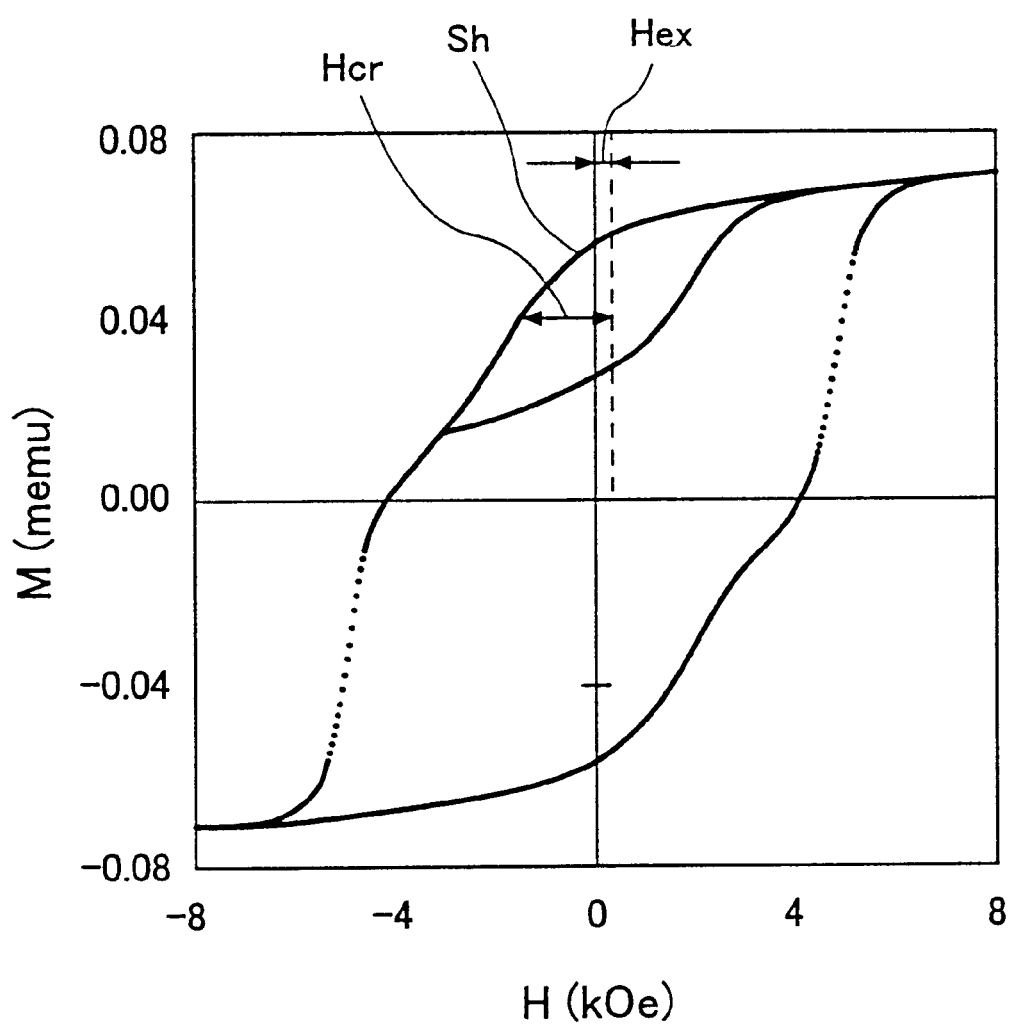
FIG. 4 is a diagram showing a hysteresis loop of a magnetic storage medium according to a comparative experiment.

FIG. 4 is a diagram similar to FIG. 2 showing a comparative case in which the magnetic layer 7 has a coercive force Hcr exceeding the exchange coupling field Hex Referring to FIG. 4, it can be seen that the magnetic reversal of the magnetic layer 7 takes place in the negative region of the external magnetic field H as represented by Sh in FIG. 4. In other words, the anti-parallel relationship between the magnetic layers 7 and 9 appears only when a magnetic field of opposite polarity is applied to the magnetic storage medium and that the parallel relationship is maintained between the magnetic layers 7 and 9 even in the case the external magnetic field H is reduced to zero. When there are two magnetic layers in a magnetic storage medium in magnetically parallel relationship, the magnetizations of the respective magnetic layers cause an overlapping, and the overlapping magnetic fields induce a medium noise.

The magnetic storage medium of the present embodiment eliminates the medium noise by positively causing the magnetic reversal in the magnetic layer 7 shortly before the external magnetic field is reduced and becomes zero.

Figure 5:
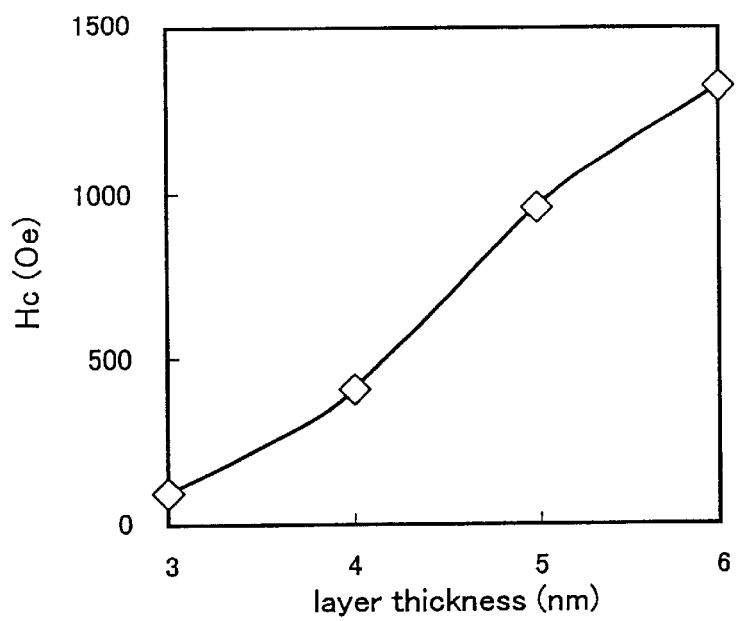
FIG. 5 is a diagram showing the relationship between a coercive force and layer thickness of a magnetic layer used in the structure of FIG. 1.
Figure 6:
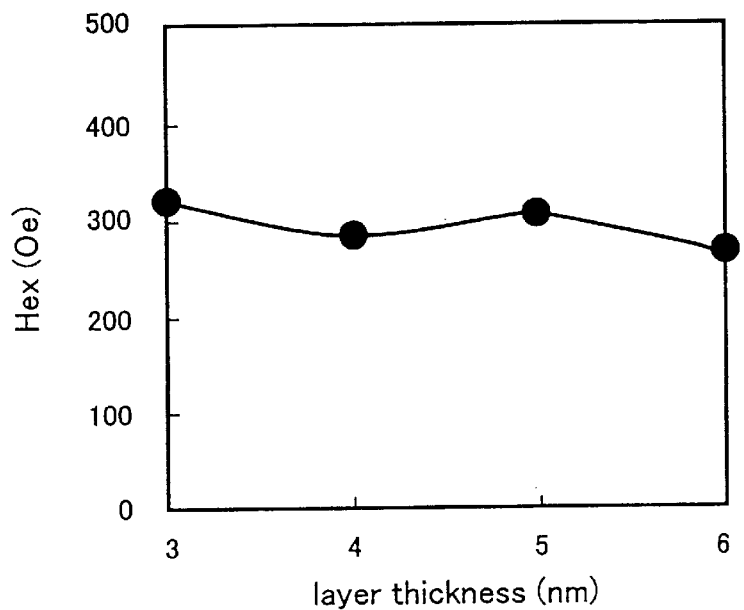
FIG. 6 is a diagram showing the relationship between an anti-ferromagnetic exchange coupling magnetic field and a thickness of a magnetic layer used in the structure of FIG. 1.
Figure 7:
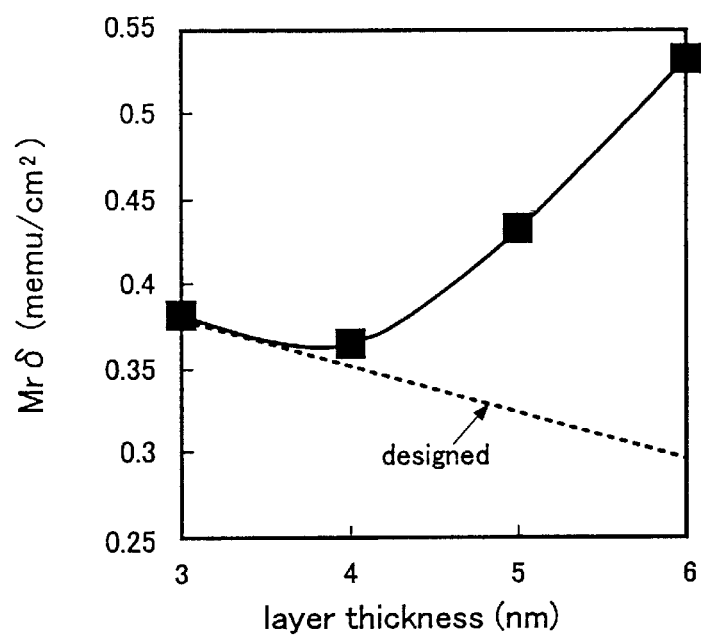
FIG. 7 is a diagram showing the relationship between an overall remnant magnetization and thickness product of the magnetic storage medium of FIG. 1 and a thickness of a magnetic layer used in the structure of FIG. 1.

FIGS. 5–7 shows the case in which the thickness of the magnetic layer 7 is changed, wherein FIG. 5 represents the relationship between the thickness of the magnetic layer 7 and the coercive force Hc thereof, FIG. 6 represents the relationship between the thickness of the magnetic layer 7 and the exchange coupling field Hex, while FIG. 7 represents the relationship between the thickness of the magnetic layer 7 and the product Mr•δ, wherein Mr represents the remnant magnetization of the composite magnetic structure as a whole while δ represents the thickness of the composite magnetic structure.

Referring to FIG. 5, it can be seen that the coercive force Hc of the magnetic layer 7 increases with increasing thickness thereof. On the other hand, FIG. 6 indicates that the increase of the thickness of the magnetic layer 7 contributes little to the exchange coupling field Hex. Further, it can be seen that the foregoing product Mr•δ takes a value far exceeding the designed value when the thickness of the magnetic layer 7 is increased beyond about 4 nm, indicating that the magnetization of the magnetic layer 7 does not undergo the necessary reversal and the magnetic parallel relationship is maintained between the magnetic layers 7 and 9 after the magnetic recording.

From the relationship of FIGS. 5–7, it is confirmed that it is necessary to suppress the coercive force of the magnetic layer 7 by suppressing the thickness thereof and that such a construction of decreasing the thickness of the magnetic layer 7 does not cause any adversel effect on the exchange coupling field Hex. The coercive force of the magnetic layer 7 may be suppressed by decreasing the magnetic anisotropy of the magnetic layer 7.

Hereinafter, the construction of the magnetic storage medium of FIG. 1 in compliance with the foregoing design principle will be described.

Referring back to FIG. 1, the non-magnetic substrate 1 may be formed of Al or an Al alloy or a glass, and may be or may not be applied with a texture processing. The first seed layer 2 is preferably formed of NiP particularly in the case the substrate 1 is formed of a glass. Further, the NiP layer 3 thereon may be or may not be subjected to the texture processing or oxidation processing. The second seed layer 4 is provided for improving the in-plane crystal alignment of the foundation layer 5 in the (001)- or (112)-oriented surface for the case in which a B2 structure alloy such as NiAl or FeAl is used for the foundation layer 5. A suitable material is used for the second seed layer 4 similarly to the first seed layer 2.

In the event the magnetic storage medium constitutes a magnetic disk, the texture processing applied to the substrate 1 or the NiP layer 3 is preferably conducted in the circumferential direction or track direction of the magnetic disk.

The non-magnetic intermediate layer 6 is provided for facilitating the epitaxial growth of the magnetic layer 9 and for suppressing of the particle size variation therein, wherein the non-magnetic intermediate layer 6 thus provided further facilitates alignment of the anisotropic axis (easy axis of magnetization) in the plane parallel to the recording surface of the magnetic storage medium. Typically, the intermediate layer 6 is formed of an hcp alloy such as CoCr-M (M being selected from any of the group consisting of B, Mo, Nb, Ta and W) and may have a thickness of 1–5 nm.

The magnetic layers 7 and 9 are formed of any of Co, Ni, Fe, a Co alloy, a Ni alloy or a Fe alloy. For example, the layers 7 and 9 may be formed of a Co alloy of the system Co—Cr—Ta or Co—Cr—Pt or Co—Cr—Pt-M, (M being selected from the group consisting of B, Mo, Nb, Ta and W).

In compliance with the principle explained above, the magnetic layer 7 is formed to have a limited thickness in the range between 1–10 nm, while the magnetic layer 9 may have a thickness of 1–30 nm. In the event the magnetic layers 7 and 9 are formed of the same material, the thickness of the magnetic layer 9 becomes larger than the thickness of the magnetic layer 7 for suppressing the coercive force of the magnetic layer 7 to be smaller than the coercive force of the magnetic layer 9. Further, each of the magnetic layers 7 and 9 may include a plurality of layers stacked with each other.

By forming the magnetic layer 7 so as to satisfy the foregoing requirement, the coercive force of the magnetic layer 7 becomes smaller than the magnitude of the exchange coupling field Hex formed as a result of the anti ferromagnetic coupling between the magnetic layers 7 and 9. As a result, the reversing magnetic field dominates before the external field reduced and becomes zero. More specifically, in the hysteresis loop such as FIG. 2, the reversing magnetic field takes a positive value larger than zero when a positive recording magnetic field H is applied. When a negative recording magnetic field H is applied, on the other hand, the reversing magnetic field takes a negative value smaller than zero.

In any of the cases in which the reversing magnetic field is positive and negative, the magnetic layer 7 becomes magnetically parallel with the magnetic layer 9 when the recording magnetic field is applied and resumes the anti-parallel state as the magnitude of the recording magnetic field is diminished, slightly before the recording magnetic field becomes zero.

In the magnetic storage medium of FIG. 1, it is possible to use the same material of the magnetic layer 7 for the magnetic layer 9.

It is preferable that the magnetic layer 9, disposed at the far side of the substrate 1 as viewed from the substrate 1, has a coercive force of 2000 Oe or more compared to that of the magnetic layer 7.

It should be noted that the non-magnetic exchange coupling layer 8 may be formed of any of Ru, Rh, Ir, Cu, Cr or an alloy thereof, wherein the non-magnetic exchange coupling layer 8 has a thickness in the range of 0.4–1.0 nm, preferably a thickness of about 0.8 nm. By choosing the thickness of the exchange coupling layer 8 as such, the anti-parallel relationship between the magnetic layers 7 and 9 is facilitated. By adjusting the thickness of the non-magnetic exchange coupling layer 8, it becomes possible to adjust the magnitude of the exchange coupling field Hex induced via the layer 8.

It should be noted that the magnetic layers 7 and 9 form, together with the non-magnetic exchange layer 8, a stacked ferrimagnetic structure.

Referring back to FIG. 1, the protective layer 10 may be formed of C, and an organic lubricating layer is provided on the protective layer 10 as the lubrication layer 11, wherein the protective layer 10 and the lubrication layer 11 form together a protective structure on the magnetic storage medium.

In the magnetic storage medium of FIG. 1, it should be noted that the layered structure provided underneath the foregoing stacked ferrimagnetic structure is not limited to those illustrated in FIG. 1 and explained heretofore.

For example, it is possible to form the foundation layer 5 from a Cr layer or a Cr alloy layer with a thickness of 5–40 nm. Further, it is possible to form the foundation layer 5 from a stacking of two layers of Cr or a Cr alloy with the thickness of 5–40 nm.

In the present embodiment, it should be noted that the magnetic layers 7 and 9 have respective remnant magnetizations $Mr_7$ and $Mr_9$ and respective thicknesses $\delta_7$ and $\delta_9$ such that the product $Mr_7 \cdot \delta_7 < Mr_9 \cdot \delta_9$. In such a construction, the composite magnetic structure in the magnetic storage medium of FIG. 1 shows an overall magnetization and thickness product provided by the differential $Mr_7 \cdot \delta_7 - Mr_9 \cdot \delta_9$ in the state the magnetic layer 7 and the magnetic layer 9 are in the magnetically anti-parallel relationship, and this differential magnetization and thickness product is observed as the pickup signal when reading of information is made from the magnetic storage medium. The same holds true when there are three or more magnetic layers in the magnetic storage medium.

SECOND EMBODIMENT

Figure 8:
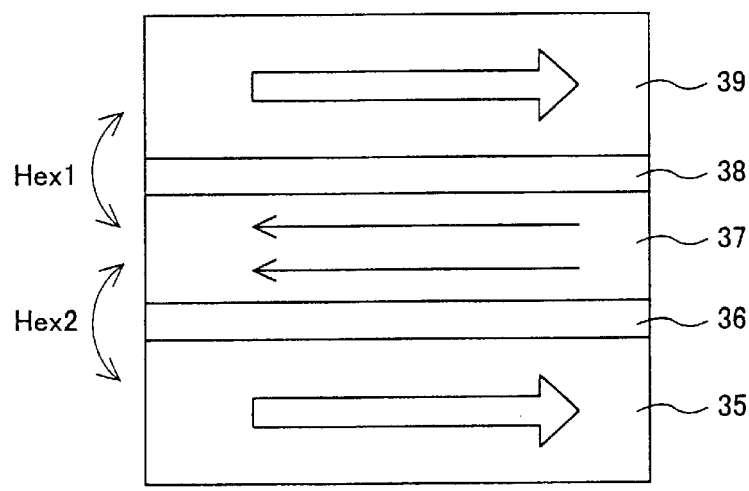
FIG. 8 is a diagram showing the construction of a magnetic storage medium according to a second embodiment of the present invention.

FIG. 8 shows the construction of a magnetic storage medium according to a second embodiment of the present invention, wherein FIG. 8 shows only the part corresponding to the composite magnetic structure.

Referring to FIG. 8, the composite magnetic structure includes a first magnetic layer 35, provided on the non-magnetic intermediate layer 6 of FIG. 1 not illustrated, and second and third magnetic layers 37 and 39 are stacked further thereon with a non-magnetic exchange coupling layers 36 and 38 interposed between the magnetic layer 35 and the magnetic layer 37 and further between the magnetic layer 37 and the magnetic layer 39. The uppermost magnetic layer 39 has the largest coercive force.

In such a three-layer construction, there is induced a first exchange coupling field Hex1 as a result of the anti-ferromagnetic coupling of the magnetic layers 37 and 39 and a second exchange coupling field Hex2 as a result of the anti-ferromagnetic coupling of the magnetic layers 35 and 37.

As a result of the anti ferromagnetic coupling, the magnetic layer 37 causes the magnetic reversal in the magnetic storage medium of FIG. 8. In order to facilitate the magnetic reversal of the magnetic layer 37, the magnetic layer 37 is formed to have a coercive force Hc2 such that the coercive force Hc2 becomes smaller than the sum of the exchange coupling fields Hex1 and Hex2(Hc2<Hex1+Hex2).

The magnetic storage medium of the present embodiment has an advantageous feature of increased degree of freedom at the time of designing the magnetic storage medium as a result of the use of the three layered structure for the magnetic layers.

THIRD EMBODIMENT

Next, a magnetic disk drive according to a third embodiment of the present invention will be described with reference to FIGS. 9 and 10 respectively showing a cross-sectional view and a plan view, wherein the magnetic disk drive uses a magnetic storage medium according to any of the preceding embodiments.

Figure 9:
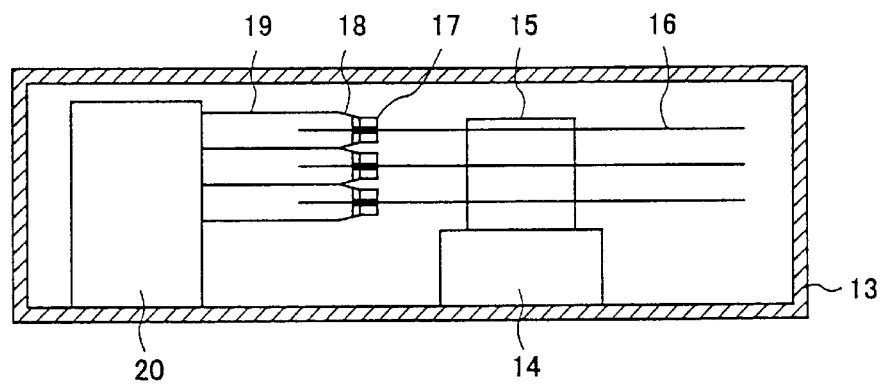
FIG. 9 is a diagram showing the construction of a magnetic storage device according to a third embodiment of the present invention in a cross-sectional view.
Figure 10:
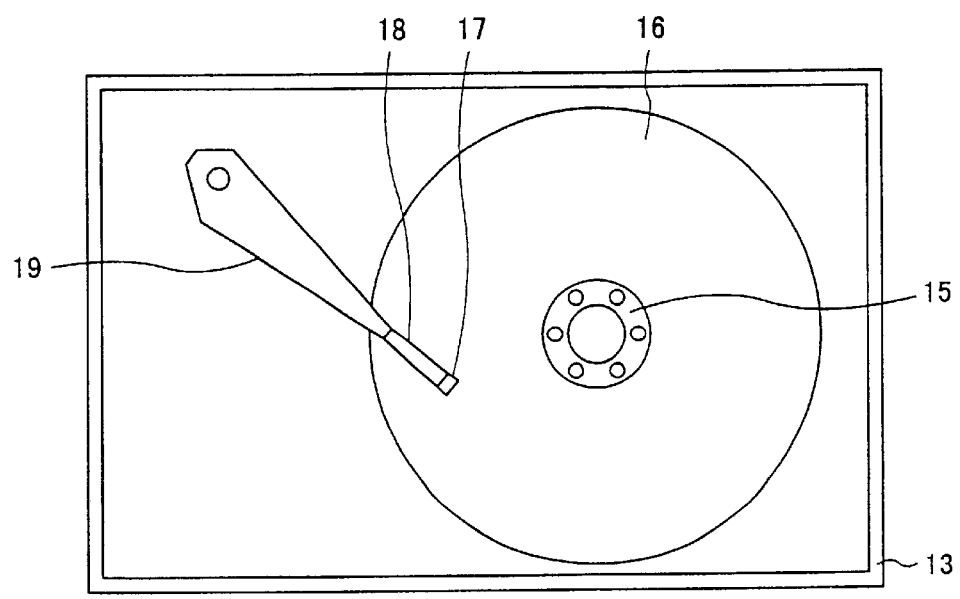
FIG. 10 is a diagram showing the construction of a magnetic storage device of FIG. 9 in a plan view.

Referring to FIGS. 9 and 10, the magnetic disk drive includes a housing 13 accommodating therein a motor 14 and a hub 15 connected to the motor 14, wherein a plurality of magnetic disks 16, which may be the magnetic storage medium of FIG. 1 or FIG. 8, are mounted commonly on the hub 15 to form a magnetic disk assembly. Adjacent to the magnetic disk assembly, there is provided an actuator unit having a rotatable shaft, and a plurality of swing arms 19 are connected to the rotatable shaft for a swinging motion in response to the actuation of the actuator 20.

Each of the swing arms 19, in turn, carries thereon a magnetic head 17 via a corresponding suspension mechanism 18 and the magnetic head 17 scans over the surface of the magnetic disk generally in a radial direction in response to the actuation of the actuator 20.

By using any of the magnetic storage medium of FIG. 1 or FIG. 8 of the present invention for the magnetic disk 16, it is possible to minimize the S/Nm ratio.

Further, the present invention is not limited to the embodiments described heretofore, but various variations and modifications may be made without departing from the scope of the invention.

What is claimed is:

1. A magnetic storage medium comprising:
   a support substrate; and
   at least first through third magnetic layers provided on said support substrate, said first and second magnetic layers having respective first and second magnetizations in an anti-parallel relationship when no substantial writing magnetic field is applied to said magnetic storage medium, said second and third magnetic layers having respective second and third magnetization in an anti-parallel relationship when no substantial writing magnetic field is applied to said magnetic storage medium,
   said first and second magnetizations being changed to a parallel relationship when a writing magnetic field is applied to said magnetic storage medium,
   said second and third magnetizations being changed to a parallel relationship when said writing magnetic field is applied to said magnetic storage medium,
   said parallel relationship between said first and second magnetizations and said parallel relationship between said second and third magnetizations being changed to said anti-parallel relationship, as a result of a magnetic reversal caused in said second magnetic layer, with diminishing of said writing magnetic field, said magnetic reversal being caused as a result of an action of a reversing magnetic field that dominates before said writing magnetic field is diminished and becomes zero,
   said magnetic storage medium further comprising first and second non-magnetic exchange-coupling layers respectively interposed between said first and second magnetic layers and said second and third magnetic layers, said first non-magnetic exchange-coupling layer inducing a first anti-ferromagnetic exchange coupling field between said first and second magnetic layers, said second non-magnetic exchange-coupling layer inducing a second anti-ferromagnetic exchange coupling field between said second and third magnetic layers,
   said second magnetic layer having a coercive force smaller than a sum of said first exchange coupling field and said second exchange coupling field.

2. A magnetic storage medium as claimed in claim 1, wherein any of said first and second exchange coupling fields has a value of at least 100 Oe.

3. A magnetic storage medium as claimed in claim 1, wherein said first magnetic layer is located above said second magnetic layer, and wherein said first magnetic layer has a coercive force larger than a coercive force of said second magnetic layer.

4. A magnetic storage medium as claimed in claim 1, wherein a magnetic layer located closest to a source of a recording magnetic field has the largest coercive force.

5. A magnetic storage medium as claimed in claim 1, wherein each of said first and second magnetic layers comprises a material selected from the group consisting of Co, Ni, Fe, a Fe alloy, a Ni alloy and a Co alloy of any of the system of Co—Cr—Ta, Co—Cr—Pt, and Co—Cr—Pt-M, M being one or more selected from the group consisting of B, Mo, Nb, Ta and W.

6. A magnetic storage medium as claimed in claim 1, wherein said second magnetic layer has a thickness of 1–10 nm, and said first magnetic layer has a thickness of 1–30 nm.

7. A magnetic storage medium as claimed in claim 1, wherein said non-magnetic exchange coupling layer is formed of a material selected from the group consisting of Ru, Rh, Ir, Cu, Cr, and an alloy thereof.

8. A magnetic storage medium as claimed in claim 1, wherein said non-magnetic exchange coupling layer has a thickness in the range between 0.4 nm and 1.0 nm.

9. A magnetic storage device, comprising:
   a motor,
   a magnetic disk mounted on a rotary hub of said motor;
   a magnetic head scanning a surface of said magnetic disk;
   an arm carrying said magnetic head such that said magnetic head scans said surface of said magnetic disk generally in a radial direction; and
   an actuating mechanism driving said arm,
   said magnetic disk comprising:
      a disk substrate; and
      at least first through third magnetic layers provided on said disk substrate,
   said first and second magnetic layers having respective first and second magnetizations in an anti-parallel relationship when no substantial writing magnetic field is applied to said magnetic storage medium,
   said second and third magnetic layers having respective second and third magnetizations in an anti-parallel relationship when no substantial writing magnetic field is applied to said magnetic storage medium,
   said first and second magnetizations being changed to a parallel relationship when a writing magnetic field is applied to said magnetic storage medium by said magnetic head,
   said second and third magnetizations being changed to a parallel relationship when said writing magnetic field is applied to said magnetic storage medium by said magnetic head,
   said parallel relationship between said first and second magnetizations and said parallel relationship between said second and third magnetizations being changed to said anti-parallel relationship, as a result of a magnetic reversal caused in said second magnetic layer, with diminishing of said writing magnetic field, said magnetic reversal being caused as a result of an action of a reversing magnetic field that dominates before said writing magnetic field is diminished and becomes zero magnetic field,
   said magnetic storage medium further comprising first and second non-magnetic exchange-coupling layers respectively interposed between said first and second magnetic layers and said second and third magnetic layers, said first non-magnetic exchange-coupling layer inducing a first anti-ferromagnetic exchange coupling field between said first and second magnetic layers, said second non-magnetic exchange-coupling layer inducing a second anti-ferromagnetic exchange coupling field between said second and third magnetic layers,
   said second magnetic layer having a coercive force smaller than a sum of said first exchange coupling field and said second exchange coupling field.

* * * * *